United States Patent [19]
Bullen et al.

[11] Patent Number: 5,836,068
[45] Date of Patent: Nov. 17, 1998

[54] MOBILE GANTRY TOOL AND METHOD

[75] Inventors: Nicholas George Bullen, Oxnard; Frank R. Chang, Cerritos, both of Calif.

[73] Assignee: Northrop Grumman Corporation, Los Angeles, Calif.

[21] Appl. No.: 834,148

[22] Filed: Apr. 14, 1997

[51] Int. Cl.[6] .............................. B23Q 39/00; B23P 23/06
[52] U.S. Cl. ........................... 29/430; 29/33 K; 29/34 B; 29/711; 901/1; 901/41
[58] Field of Search .............................. 29/33 K, 34 B, 29/33 P, 711, 783, 791, 792, 56.6, 430; 409/202, 212, 224, 137; 901/41–47; 74/608; 414/9; 364/167.01

[56] References Cited

U.S. PATENT DOCUMENTS

| | | |
|---|---|---|
| 4,636,137 | 1/1987 | Lemelson ................................ 901/46 X |
| 4,815,011 | 3/1989 | Mizuno et al. ............................ 395/99 |
| 4,838,531 | 6/1989 | Corsi ........................................ 269/21 |
| 4,885,836 | 12/1989 | Bonomi et al. ......................... 29/524.1 |
| 5,033,174 | 7/1991 | Zieve ........................................ 29/34 B |
| 5,084,951 | 2/1992 | Bonomi et al. ........................... 29/26 A |
| 5,104,033 | 4/1992 | Tanaka et al. ......................... 29/792 X |
| 5,121,907 | 6/1992 | Engwall ..................................... 269/21 |
| 5,148,091 | 9/1992 | Lagercrantz ....................... 318/568.11 |
| 5,174,555 | 12/1992 | Lossing ...................................... 269/71 |
| 5,177,563 | 1/1993 | Everett et al. ......................... 901/47 X |
| 5,181,809 | 1/1993 | Martin ......................................... 408/3 |
| 5,220,718 | 6/1993 | Speller, Sr. et al. ...................... 29/431 |
| 5,380,978 | 1/1995 | Pryor ................................... 219/121.64 |
| 5,468,099 | 11/1995 | Wheetley et al. ...................... 408/1 R |
| 5,503,513 | 4/1996 | Detriche ....................................... 414/9 |
| 5,555,616 | 9/1996 | Michalewski et al. ................... 29/509 |
| 5,587,900 | 12/1996 | Bullen ................................ 364/167.01 |

FOREIGN PATENT DOCUMENTS

| | | | |
|---|---|---|---|
| 52-75761 | 6/1977 | Japan ......................................... 901/1 |
| 402190276 | 7/1990 | Japan ......................................... 901/1 |

*Primary Examiner*—William R. Briggs
*Attorney, Agent, or Firm*—Terry J. Anderson; Karl J. Hoch, Jr.

[57] ABSTRACT

The present invention is a mobile tool positioning system including a support assembly, a mobile multi-axis, numerically controlled robotic tool, and a multi-movement control device coupled to the mobile multi-axis tool. The support assembly is located adjacent a workpiece and has a plurality of engagers. The mobile multi-axis, numerically controlled robotic tool has proximity sensors removably attached to the engagers. The mobile tool can therefore be detachably coupled to the support assembly. The proximity sensors precisely locate and align the mobile tool with the support assembly before being coupled. In addition, the mobile tool can have a self leveling system with a configurable memory. As such, precision tooling operations can be performed on the workpiece.

33 Claims, 3 Drawing Sheets

MOBILE GANTRY TOOL AND METHOD

BACKGROUND OF THE INVENTION

1. Field of the Invention

The present invention relates to mobile precision positioning tools and support of the tool with respect to a workpiece surface in a work envelope.

2. Related Art

The precision machining of large workpieces requires the use of a wide array of expensive machine tools such as full size models and gauges, templates, fixtures, and drill-sets. These tools have a substantial acquisition and maintenance costs, as well as costs related to their storage, property management, inspection, reinspection, and accountability. In addition, the manufacturing tolerances and repeatability achievable with these tools is limited.

For example in the aerospace industry, large airframe components such as fuselage sections can be precision machined only with the use of very costly full size models and gauges. A typical series of models needed to drill precision holes is shown in FIGS. 1A–1B. As shown in FIG. 1A, the first step in this process is to fabricate a male master model 100 of a fuselage section, which model is made of metal or plaster and has projections 105 of the size and at the locations required for the holes to be drilled in the fuselage section. A female plaster cast 110 is formed over the model 100, which cast has apertures 115 formed over the projections 105.

As shown in FIG. 1B, a male cast back 120 is formed from the plaster cast 110, which cast back is also made from plaster. Again, projections 125 are formed by the plaster flowing into the apertures 115 in the cast 110. Finally, a drill bonnet 130 made of a composite material, such as fiberglass or graphite composite, is formed over the cast back 120. The bonnet 130 has apertures 135 of the correct size and at the correct locations where holes are required to be drilled.

The first step in using the bonnet 130 is to fasten a fuselage section into an assembly jig using bracing means, or "details", and locator pins to provide a reference position for the fuselage. The bonnet 130 is then secured adjacent the fuselage section and aligned with the section using the locator pins. The bonnet 130 then serves as a drilling template through which holes are drilled into the fuselage section.

The cost to fabricate a typical drill bonnet 130 can average $1 million and take from 1 to 12 months. As an example, for the F-18 aircraft, 900 bonnets are needed to drill all the fuselage holes. Thus, the total cost for the drill bonnet tool family for the F-18 is approximately $1 billion. Full scale interior models, called master gages, are also required to precisely locate and drill holes in details which are attached to interior structures of the assembly jig. These details are used to locate bulkheads, frames and ribs of the aircraft. Such master gages can cost between $5–10 million each and the F-18 requires 33 such master gages, for a total master gage tool family cost of approximately $250 million. In addition, new master models and gages need to be fabricated for either a new aircraft component or changes to an existing one, requiring from four to 24 weeks to prepare.

Therefore, what is needed is a device that eliminates the need for these costly tool families and is made from standardized parts to reduce cost and fabrication time. What is also needed is a device with a mobile machine tool locating system. What is additionally needed is a device which increases the speed with which an assembly jig can be prepared to machine a new workpiece, or implement engineering changes to an existing workpiece design. Further, what is needed is a device having a leveling mechanism with a programmable memory to improve accuracy of hole location and to allow repetitive tooling operations.

Whatever the merits of the above mentioned systems and methods, they do not achieve the benefits of the present invention.

SUMMARY OF THE INVENTION

To overcome the limitations in the prior art described above, and to overcome other limitations that will become apparent upon reading and understanding the present specification, the present invention is a mobile tool positioning system. The mobile tool positioning includes a support assembly, a mobile multi-axis, numerically controlled robotic tool, and a multi-movement control device coupled to the mobile multi-axis tool.

The support assembly is located adjacent a workpiece and has a plurality of engagers. The mobile multi-axis, numerically controlled robotic tool has proximity sensors removably attached to the engagers. The mobile tool can therefore be detachably coupled to the support assembly. The proximity sensors precisely locate and align the mobile tool with the support assembly before being coupled. In addition, the mobile tool can have a self leveling system with a configurable memory, such as the self leveling system disclosed and described in U.S. Pat. No. 5,587,900, issued on Dec. 24, 1996 to Bullen, entitled SELF LEVELING INDEPENDENTLY PROGRAMMABLE SYSTEM, the teachings of which are incorporated herein by reference. As such, precision tooling operations can be performed on the workpiece.

The self leveling system senses and changes the inclination of the mobile tool. The self leveling device includes a lifting device affixed under a horizontal member, a level sensing device affixed to the member for sensing an inclination of the member, a computer for inputting a desired orientation of the manufacturing plane with respect to the horizon, a device for comparing the sensed inclination of the horizontal member with the desired orientation, a device for computing a change in the sensed inclination to achieve the desired orientation, and a device to transmit a control signal proportional to the change to the lifting device for achieving the desired orientation of the manufacturing plane.

A feature of the present invention is its mobility. Another feature of the present invention is its precise locating system. Yet another feature of the present invention is its self leveling mechanism with configurable memory. An advantage of the present invention is that it eliminates the need for costly tool families. Another advantage of the present invention is that it increases the speed with which an assembly jig can be prepared to machine a new workpiece, or implement engineering changes to an existing workpiece design. Yet another advantage of the present invention is its ability to perform repetitive tooling operations with reconfiguration.

The foregoing and still further features and advantages of the present invention as well as a more complete understanding thereof will be made apparent from a study of the following detailed description of the invention in connection with the accompanying drawings and appended claims.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

Figure 2B:
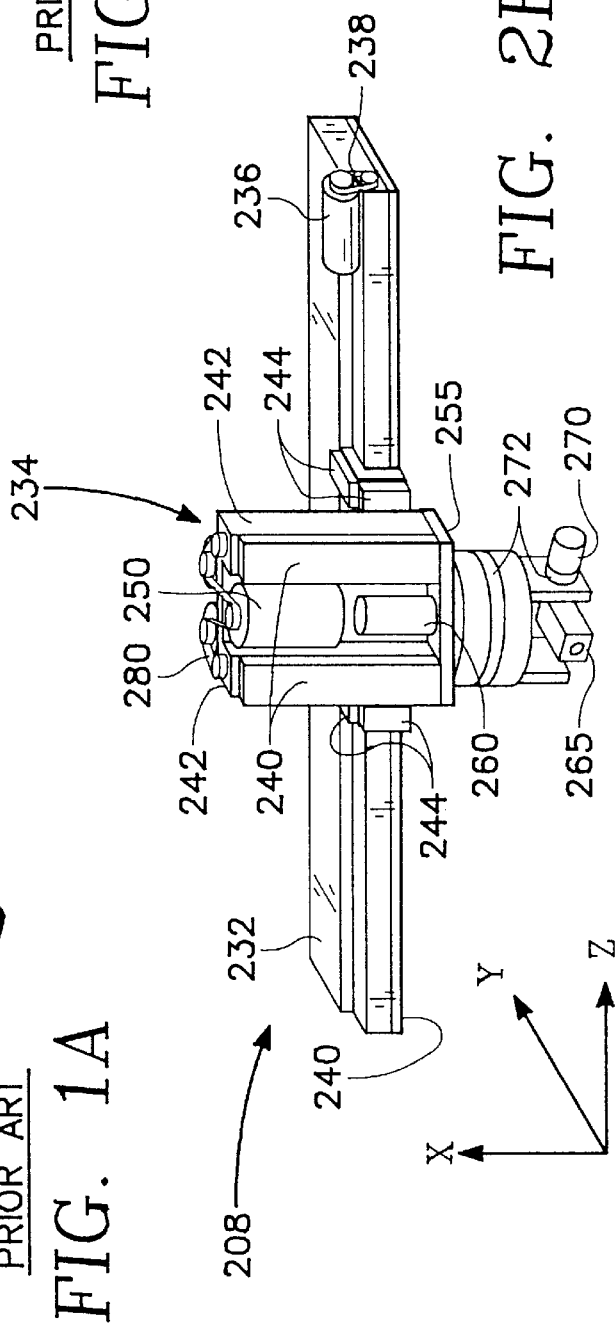
FIG. 2B is a perspective view detailing the tool of the mobile positioning system of the present invention.
Figure 2A:
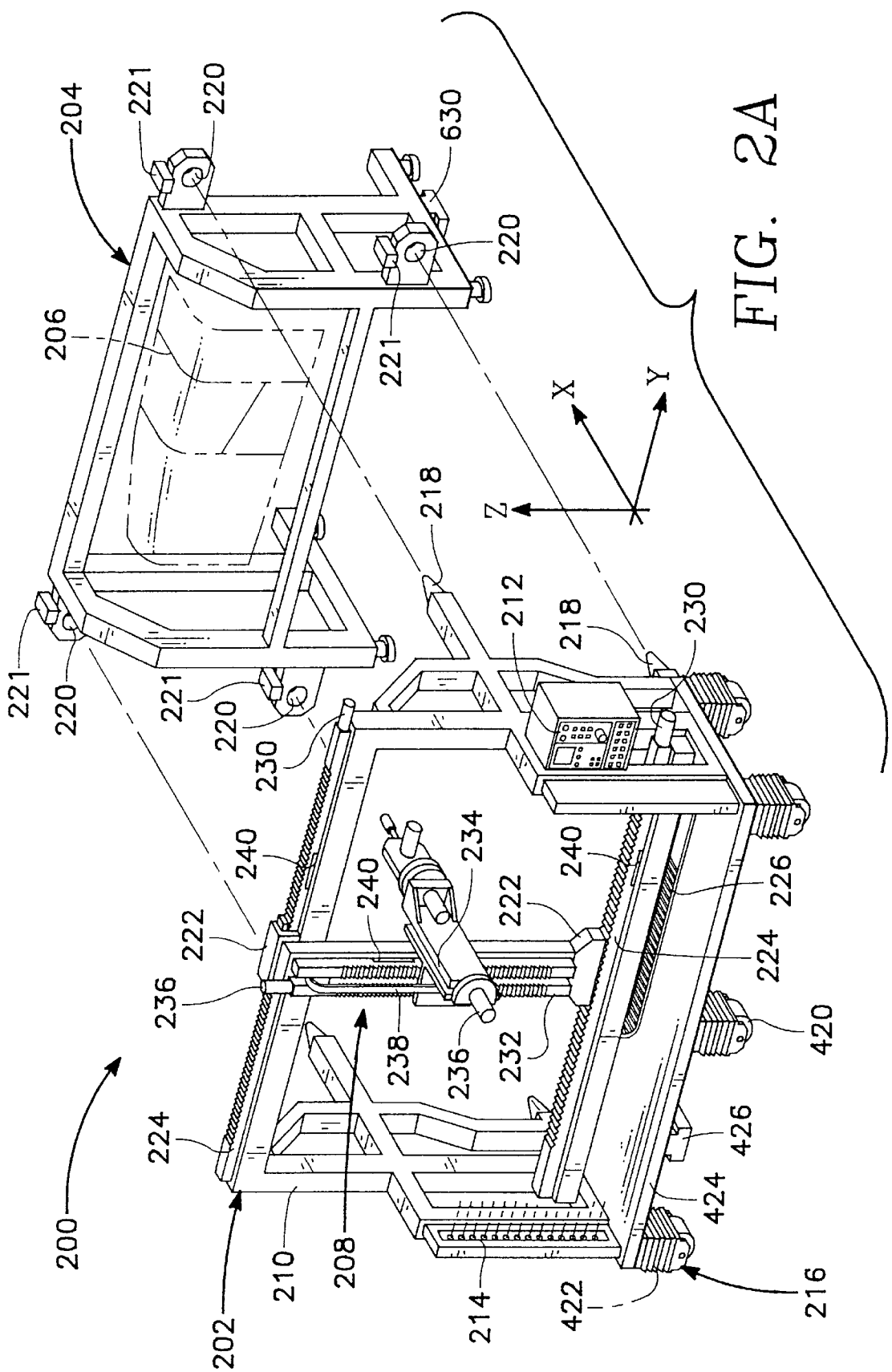
FIG. 2A is a perspective view of the mobile positioning system of the present invention.

FIG. 2A is a perspective view of the mobile positioning system of the present invention. The mobile positioning system 200 of the present invention includes a mobile robotic device 202, a support assembly 204, such as a jig, and a workpiece 206 located within the support assembly 204. The mobile tool 202 is transportable from one support assembly to another.

The mobile robotic device 202 includes a tool 208, a tool support frame 210, a controller 212, a safety curtain 214, such as an infrared safety curtain, a leveling system 216, such as the self leveling system disclosed and described in U.S. Pat. No. 5,587,900, issued on Dec. 24, 1996 to Bullen, entitled SELF LEVELING INDEPENDENTLY PROGRAMMABLE SYSTEM, the teachings of which are incorporated herein by reference, and a plurality of proximity sensors 218. The leveling system 216 and proximity sensors 218 allow the mobile tool 202 to be transportable from one support assembly to another with precision.

The support assembly 204 is located adjacent the workpiece 206 and has a plurality of engagers 220. The proximity sensors 218 are removably coupled to the engagers 220, thereby allowing the mobile robotic device 202 to be detachably coupled to the support assembly 204. As such, mobile precision tooling operations can be performed on the workpiece 206.

Component Parts

Referring to FIG. 2B along with FIG. 2A, the tool 208 is preferably a multi-axis computer numerical controlled (CNC) gantry for performing specific tasks on the workpiece 206. The tool 208 is slidably attached to the tool support frame 210 to facilitate lateral movement along the Y axis. Lateral movement can be achieved, for example, by having dual longitudinal translation modules 222 engaged in corresponding translation rails 224. Any suitable arrangement for allowing the tool 208 to traverse along the Y axis with respect to the tool support frame 210 can be used, such as a carriage belt/drive arrangement 226 with synchronized servo motors 230 controlled by the controller 212. The longitudinal translation modules 222 are preferably removably attached to the tool support frame 210 to allow tool 208 or frame 210 cleaning or other maintenance.

The tool 208 also includes a vertical translation module 232 and a transverse translation module 234. The vertical translation module 232 is preferably parallel to the Z axis and the transverse translation module 234 is preferably parallel to the X axis. Both are driven by respective servo motors 236. The motors 236 may be connected to the modules 232, 234 either by a belt reduction drive 238, gear drive, or a direct drive.

The tool support frame 210 and all the translation modules 222, 232, 234 also include linear sensors 240 located along a length of the respective frame or module. The sensors 240 are feedback sensors, such as laser sensors, glass scales or digital strips (discussed below in detail). Glass scales or digital strips generally have a length of approximately the same length as the frame or translation module on which it is mounted.

The transverse translation module 234 can include dual sub-modules 242 and sliding pads 244 driven by a single servo motor 250. Dual sub-modules 242 provide additional strength to support the weight of the transverse translation module 234 and prevent the back pressure from a machining operation from displacing the structure, which could cause machining errors. The dual sub-modules 242 also include sensors 240 along their length. Again, the motor 250 may be connected to the sub-modules 242 either by a belt reduction drive 280, gear drive, or a direct drive. The belt reduction drives 238, 280 or gear drives provide increased accuracy in translational movement of the sliding pads 244.

The sub-modules 245 translate a carriage 255 along the X axis, on which a rotation motor 260 is mounted in order to rotate a machine tool 265 along the A axis. In accordance with one preferred embodiment of the invention, the machine tool 265 will be an electric drill for forming apertures in the workpiece. A pivot motor 270 is also mounted on the carriage 255 and the pivot motor rotates the machine tool 265 along all axes perpendicular to the X axis, depending on the position of the rotation motor 260. Rotational sensors 272 are mounted on each of the rotational motor 260 and pivot motor 270 to measure the angular rotation of the motors. As a result, rotation about the A, B, and W axes are achieved.

Figure 3:
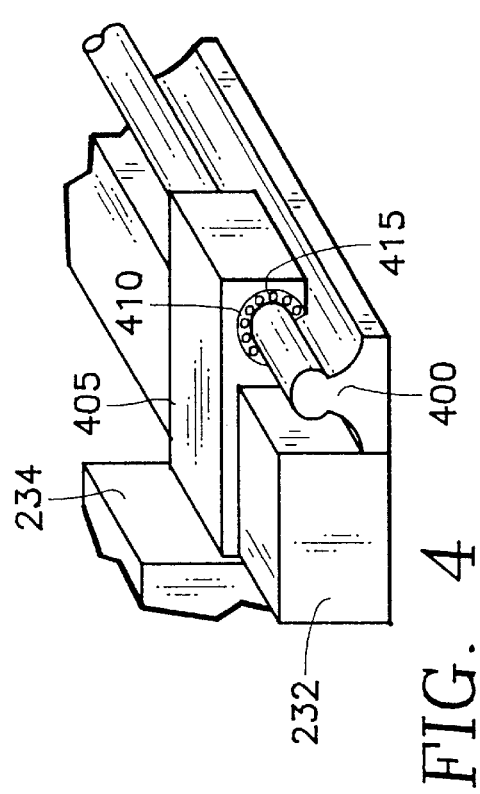
FIG. 3 is a perspective view of a portion of the system of FIG. 2B showing a translation module.

FIG. 3 is a perspective view of a portion of the system of FIG. 2B showing a translation module. The translation modules 222, 232, and 234 can use conventional ballscrew drive construction, which provides accurate control at a minimum cost. As shown in FIG. 3, each module 222, 232, and 234 consists of guide rails 300 and a ball lead screw 310 mounted in a parallel position between the rails. The ball lead screw 310 is supported at both ends of the module by bearings 315, which are mounted on a support plate 305 that also supports the rails 300.

The pad 244 includes a threaded guide 320 which is positioned adjacent between the rails 300 and engages the screw 310. As the screw 310 turns, the sliding pad 244 translates along the direction of the rails 300. The screw 310 can be coupled directly to a servo motor, such as the motor 236 in FIG. 2B, or by means of the belt reduction drives 238, 280 or gear drives, to servo motors 236 and 250, respectively (also in FIG. 2B).

Figure 4:
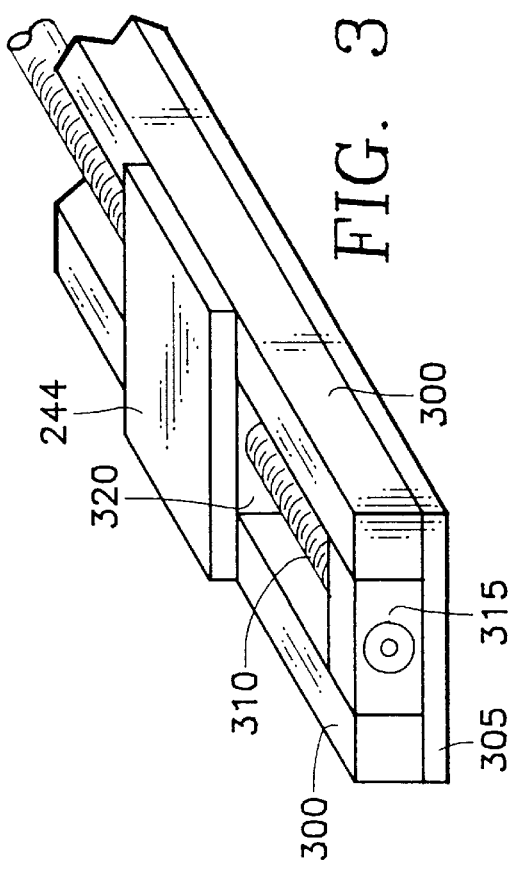
FIG. 4 is a perspective view of a portion of a second embodiment of the system of FIG. 2B showing a ballrail and pad assembly.

FIG. 4 is a perspective view of a portion of a second embodiment of the system of FIG. 2B showing a ballrail and pad assembly. In this embodiment of the invention, a ballrail 400 is mounted near the module 232 and is parallel to the transverse module 232. Further, the ballrail 400 is positioned on the opposite side of the module 232 from the transverse translation module 234 and is connected to the transverse translation module by a modified sliding pad 405, which translates along the module 232 in a manner identical to sliding pad 244 (shown in FIG. 2B). The pad 405 is operatively connected to the ballrail 400 at a semicircle 410 whose ballrail facing surface is covered with ball bearings 415. The ballrail 400 and pad 405 assembly (a "ballrail and pad assembly") allows translation along the Z axis, but prevents motion of the pad 405 is the X direction.

The advantage of this ballrail and pad assembly is to offset the lever arm produced by the transverse translation module 234 about the module 232, thus improving stability of the machine tool 265 (shown in FIG. 2B) during machine operations. For example during a drilling operation, a resistance force ("drill-back") may develop that can displace the drill and reduce the hole accuracy. The effect of drill-back is substantially reduced by the ballrail and pad assembly.

Transportability of the mobile tool 202 from assembly tool to assembly tool is accomplished by the leveling system 216. Referring back to FIG. 1, the preferred self leveling system 216 of the present invention is similar (differences discussed below) in principle and in operation to the self leveling system disclosed and described in U.S. Pat. No. 5,587,900, issued on Dec. 24, 1996 to Bullen, entitled SELF LEVELING INDEPENDENTLY PROGRAMMABLE SYSTEM, the teachings of which are incorporated herein by reference. In addition, the support assembly 204 can have the self leveling system disclosed in U.S. Pat. No. 5,587,900 described above and can operate in accordance with U.S. Pat. No. 5,587,900.

The preferred leveling system 216 of the mobile tool 202 comprises a transportable mechanism 420, such as caster wheels, lifting devices 422, such as jacks, a horizontal member 424, a level sensing device 426 affixed to the member 424 for sensing an inclination of the member 424, and a computer module as part of controller 212 for inputting a desired orientation of the manufacturing plane with respect to the horizon. Each caster wheel 420 is preferably affixed to a respective jack 422, each of which are preferably affixed to the member 424.

Sensor cables (not shown) and lifting device cables (not shown) connect the sensors and lifting devices, respectively, to the controller 212. A suitable comparing device (not shown) compares the sensed inclination of the horizontal member 424 with the desired orientation and another device (not shown) computes changes in the sensed inclination to achieve a desired orientation. Also, another device (not shown) transmits a control signal proportional to the change to the lifting devices 422 for achieving the desired orientation of the manufacturing plane.

The leveling system 216 is a multi function system. For instance, some of the functional attributes of the system include the ability to store in memory location heights of different support assemblies. This facilitates quick and precise attachment to a certain support assembly during mobile transport from one support assembly to another. Also, the leveling system 216 has dormant storage leveling capabilities. This function allows storage of certain location heights in memory, thereby preventing racking of the system frame from storage on uneven surfaces.

Figure 1A:
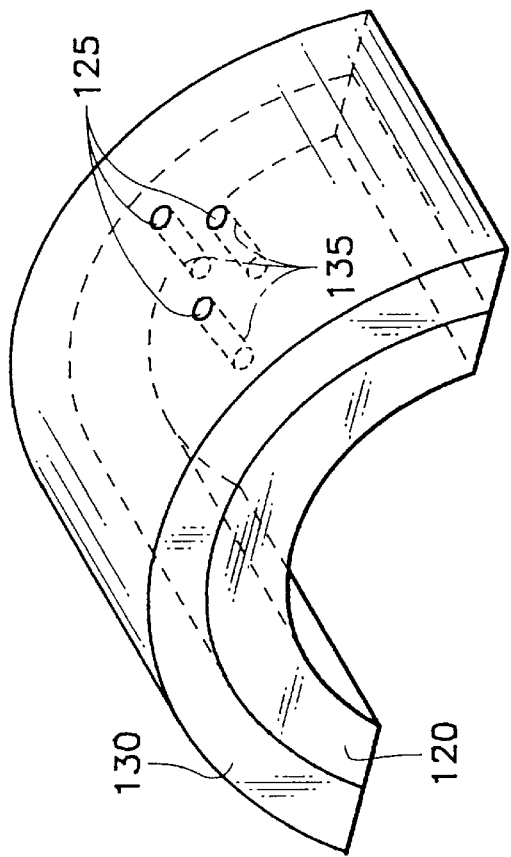
FIG. 1A is a perspective view of a prior art mold used to fabricate a drill positioning bonnet.
Figure 1B:
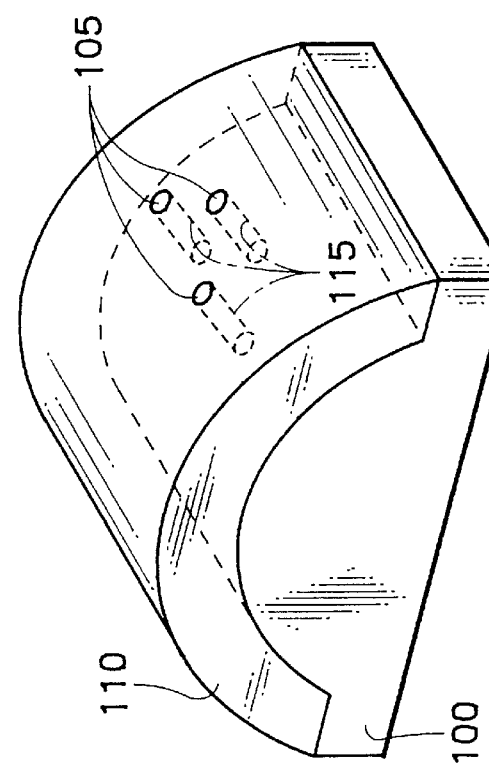
FIG. 1B is a perspective view of a prior art mold used to fabricate a drill positioning bonnet.

In the embodiment depicted in FIG. 1, the leveling system 216 is incorporated with the mobile tool 202 as a 6-point caster wheel jack leveling system with N-position memory and self adjustment control. More or less wheels can be used, but six wheels are preferred. In addition, the proximity sensors 218 (level sensors), are preferably a 4-point cone sensor system with 4 male cone sensors and corresponding female cone sensors. Each male cone sensor engages with a respective engager 220, such as the female cone sensor, of the support assembly 204. The male and female sensors are preferably positioned such that respective center lines are parallel to center lines of the mobile tool 202 and support assembly 204, respectively. Also, the 4-point cone system can have a lock 221, such as a manual or automatic lock, when an in-position signal is achieved. For instance, the automatic lock is triggered by proper engaged position of the mobile tool with the support assembly. The operation of the self leveling system will be discussed in detail below.

Operation

Figure 5:
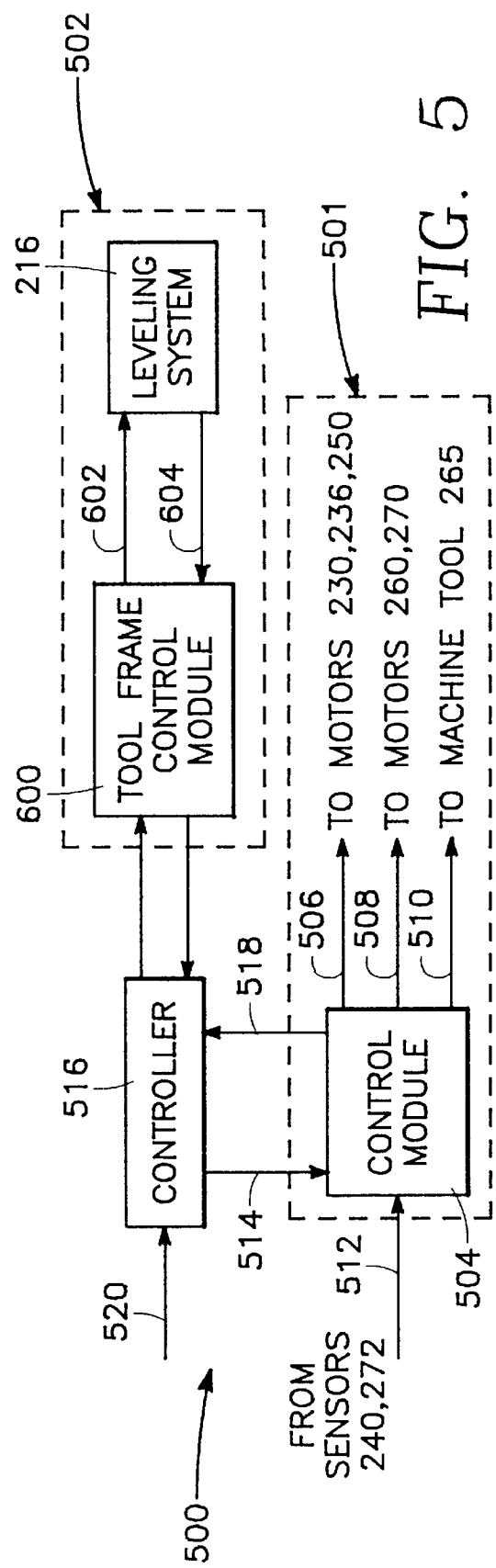
FIG. 5 is a block diagram of a control means for the system of FIG. 2A.

FIG. 5 is a block diagram of a controller for the system of FIGS. 2A and 2B. The mobile positioning system 200 and tool support frame 210 of FIG. 2A can be controlled by a controller 500 comprised of a tool computer numerical control (CNC) device 501 and a tool frame CNC device 502, respectively, as illustrated in FIG. 5.

For the tool computer numerical control (CNC) device 501, a conventional servo control module 504 sends translation signals 506 to the motors 230, 236, and 250 (shown in FIG. 2B), rotation signals 508 to the motors 260 and 270 (shown in FIG. 2B) and operation signals 510 to the machine tool 265 (shown in FIG. 2B). The module 504 receives sensor signals 512 from the linear sensors 240, 270 and rotational sensors 272 (shown in FIG. 2B).

The sensor signals 512 measure the proximity of (a) the initial machining part of the machine tool 265 (e.g. the tip of a drill) to a desired set of X, Y and Z coordinates (referred to as the "vector"), and (b) the orientation of the tool path (e.g. the drill centerline) to the contour of the workpiece surface (referred to as the "normal") as defined by rotation and pivot angles.

The module also receives task signals 514 from a conventional industrial controller 516, and sends task completion signals 518 to the controller 516. The controller 516 generates the task signals 514 from a workpiece database 520 that is sent to the controller 516. The workpiece database 520 comprises a set of task signals 514 and defines the work to be performed on workpiece, such as the location, orientation and depth of holes.

As shown in FIG. 5 each task signal 514 defines a task to be performed on the workpiece and is generated by the controller 516. For example if the task is to drill a hole in the workpiece, a basic data item in the task signal 514 would be the location of the drill tip, i.e. the vector, and is defined by x, y and z coordinates in relation to a workpiece reference datum. Another data item is the normal, which is defined by angles about the rotation and pivot axes at a selected vector. Other data to be defined could include the speed of the drill, the feed rate at which the drill moves with respect to the workpiece, and the distance that the drill is to travel (which determines the depth of the hole).

The controller 516 holds in memory each task signal 514 in the workpiece database 520. This workpiece database 520 could be provided by a computer aided design ("CAD") program defining a finished workpiece and could be entered in the controller 516 by manual or magnetic means.

In addition, the controller 516 determines when a task signal 514 (e.g. comprising the vector, normal, drill rates and distance) is sent to the control module 504. For example, the controller 516 could be programmed to send the task signal 514 to the module 504 only after a hole drilled pursuant to a previous task signal has been finished, i.e., a "when done" command.

When a task signal 514 is sent to the control module 504, it sends translation signals 506 and rotation signals 508 to move the machine tool 265 (shown in FIG. 2B) to the desired vector and normal. If the desired vector or normal of the task signal 514 is not reached by means of the translation signals 506 or rotation signals 508, one or more sensor signals 512 proportional to the error in coordinates or angles will be sent to the module 504. The module 504 then generates appropriate revised translation signals 506 or rotation signals 508 in order to make the correction in vector or normal. The translation signals 506 and rotation signals 508 also include a velocity command that directs the speed of the motors 210, 230 and 250 (shown in FIG. 2B) in order to control the time at which the desired vector will be reached.

After the desired position is reached, the module 504 sends the operation signal 510 (i.e. the remaining information from the task signal 514) to accomplish the desired work. For example when a drill reaches a desired vector and normal, the module 504 sends to a drill the operation signal 510, comprising a drill speed, drill feed rate, and a drill distance. After this operation signal 510 has been sent, module 504 sends the completion signal 518 to the controller 506, which then sends a subsequent task signal 514 to the module 504 and the operation is repeated until all the tasks in the workpiece database 520 have been completed.

In a second preferred embodiment, the linear sensors 240 and rotational sensors 272 (shown in FIG. 2B) are digital strip sensors. Digital strip sensors are cheaper and less expensive to use than conventional laser measuring means and do not adversely affect the performance of the system 200. This result can be a significant savings because laser sensors can cost as much as 20 percent of the cost of the system 200.

This embodiment is achieved by using the digital strips as the sensors to measure the vector of the machine tool 265 at maximum travel positions of each translation module 222, 232 and 234 (shown in FIG. 2B), and at several commanded intermediate positions. These vectors are compared with the location signals 506 (shown in FIG. 5) sent to reach each of the measured positions, and vector errors are determined for each module. This set of vector errors is programmed into the memory of the controller 516. After this calibration procedure, when the workpiece database 520 requires movement to a set of coordinates, the controller 516 corrects the task signal 514 by the amount of the vector errors. A similar calibration procedure is used to measure normal errors and to eliminate the need for rotational sensors 272.

The self leveling system 630 of the support assembly 204 of FIG. 2A operates in a similar manner as the self leveling system disclosed and described in U.S. Pat. No. 5,587,900, issued on Dec. 24, 1996 to Bullen, entitled SELF LEVELING INDEPENDENTLY PROGRAMMABLE SYSTEM, the teachings of which are incorporated herein by reference.

However, the self leveling system 216 of the mobile tool 202 operates similar to the self leveling system disclosed and described in U.S. Pat. No. 5,587,900, with the exception that the proximity sensors of the self leveling system 216 self adjusts the mobile tool 202 to be aligned with the engagers of the support assembly 204, instead of the horizon. This is because the self leveling system 630 is aligned with the horizon. Nevertheless, the principle operation of self leveling is similar.

In a preferred embodiment, for tool frame control device 502, a tool support frame control module 600 sends translation and operation signals 602 to the self leveling system 216 (shown in FIG. 2A). The module 600 also receives position and sensor signals 604 from the self leveling system 216 (shown in FIG. 2A). The translation and operation signals 602 provide movement while the position and sensor signals provide specific position and locations to precisely engage the male cones within the female cones.

Initial calibration of each support assembly is stored into memory. The operation of the self leveling system for attachment to a specific pre-stored support assembly can begin by an operator selecting a particular support assembly. For fine tune adjustment, as the mobile tool is positioned for engagement to the support assembly, the male cone sensor senses the presence and geometry of the inverse female cone sensor for proper engagement.

Presence can be determined by either mechanical means, electrical means, or the like. For example, a mechanical apparatus such as a "bump and feel" device with physical sensors can be used. The male cone sensor "feels" the geometry of the female cone as the male cone becomes in close or contacting physical proximity with the female cones. An electrical apparatus such as a laser, electronic, or optical eye can be used. The eye of the male cone sensor detects the geometry of the female cone as the male cone becomes in close proximity with the female cones.

In any case, the controller receives signals from the male sensor regarding position and location of the male cone sensor within the geometric vicinity of the inverse female sensor. The controller processes these signals and appropriately adjusts the height and lateral location of the mobile tool 202 as the male cone sensor is within the geometric vicinity of the inverse female sensor. For example, the male cone sensors may transmit a sensing signal that indicates a nonparallel condition of the sensor with respect to the female cone. The controller receives this sensing signal, identifies which lifting device requires adjustment to make the male cone parallel with the female cone for proper engagement, and then transmits a control signal to the selected lifting device until the sensing signal is no longer received.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A mobile tool positioning system, comprising:
at least one support assembly located adjacent a workpiece, said at least one support assembly including at least one engager;
a mobile multi-axis numerical controlled robotic tool having at least one proximity sensor removably engaged to said at least one engager, wherein said mobile tool is detachably coupled to said at least one support assembly and transportable between at least one support assembly and another support assembly with another workpiece for performing tooling operations on each respective workpiece; and
a multi-movement control device coupled to said mobile tool;
wherein at least one of the support assembly and the mobile tool includes a self leveler.

2. The system of claim 1, wherein said at least one support assembly further includes a self leveler.

3. The system of claim 1, wherein said mobile tool includes a self leveler.

4. The system of claim 2, wherein said self leveler is a horizon leveling system.

5. The system of claim 3, wherein said self leveler is a horizon leveling system.

6. The system of claim 1, wherein said mobile tool further includes a self leveling system coupled to said proximity sensors for properly aligning and engaging said mobile tool with said at least one support assembly.

7. The system of claim 6, wherein said self leveling system has a configurable memory for storing an engaging location for said at least one support assembly and other support assemblies.

8. The system of claim 1, wherein said at least one proximity sensor is a 4-point male cone sensor and said at least one engager is a 4-point female cone sensor.

9. A mobile tool positioning system, comprising:
at least one support assembly located adjacent a workpiece, said at least one support assembly including at least one engager;
a mobile multi-axis numerical controlled robotic tool having at least one proximity sensor removably engaged to said at least one engager, wherein said mobile tool is detachably coupled to said at least one support assembly and transportable between at least one support assembly and another support assembly with another workpiece for performing tooling operations on each respective workpiece;
a multi-movement control device coupled to said mobile tool, and
a safety curtain located on said mobile tool.

10. The system of claim 9, wherein said safety curtain is an infrared curtain.

11. The system of claim 6, wherein said self leveling system is 6-point caster wheel jack leveling system with N-position configurable memory for storing locations and positions for said at least one support assembly to facilitate aligned engagement between said mobile tool and said respective support assembly.

12. The system of claim 6, wherein said at least one engager has an automatic lock triggered by proper engaged position of said mobile tool.

13. The system of claim 12, wherein said lock is manual.

14. A mobile tool positioning system, comprising:
at least one support assembly located adjacent a workpiece, said at least one support assembly including at least one engager;
a mobile multi-axis numerically controlled tool having a machine tool and at least one proximity sensor detachably engaged to said at least one engager, wherein said mobile tool is detachably coupled to each of said support assemblies and transportable between said support assemblies for performing tooling operations with said machine tool on each respective workpiece, wherein said mobile tool comprises,
a plurality of translation modules having longitudinal sliding pads and a longitudinal movement device;
a transverse translation module removably mounted to said longitudinal sliding pads in a generally perpendicular orientation to said longitudinal modules and having transverse sliding pads and a transverse movement device; and
a vertical translation module affixed to said transverse sliding pads in a generally perpendicular orientation to said longitudinal and transverse translation modules and having vertical sliding pads and a vertical movement device, said vertical translation module comprising a mounting device for said machine tool and a rotator to rotate said machine tool about a rotational axis and a pivotor to pivot said machine tool about any pivot axis orthogonal to said rotational axis; and
a multi-movement control device coupled to said portable multi-axis tool.

15. The system of claim 14 wherein each of said translation modules further comprises:
a rail supporting each of said respective sliding pads; and
a linear ballscrew threadedly engaged with each of said respective sliding pads.

16. The system of claim 14 wherein each of said movement device of each of said translation modules further comprises:
a motor connected to each of said respective translation module for moving each of said respective sliding pads along each of said respective module.

17. The system of claim 16 further comprising:
a belt reduction drive connecting said motor to each of said respective translation module.

18. The system of claim 14 wherein said vertical translation module further comprises:
a secondary vertical translation module aligned parallel to said vertical translation module and having secondary vertical sliding pads and connected to said vertical movement device.

19. The system of claim 14 wherein said control device comprises:
a controller for storing control signals for each of said respective movement device and for said machine tool, and sending said control signals to each of said respective movement device and said machine tool at predetermined intervals.

20. The system of claim 19 wherein said control signals for each of said respective movement device further comprise:
a set of Cartesian coordinates for each of said respective movement devices; and
a set of angles for each of said rotator and pivotor.

21. The system of claim 20 wherein said control signals for said machine tool further comprise:
a set of machine tool operation instructions.

22. The system of claim 14 wherein:
each of said translation modules, rotator, and pivotor further comprises a sensor for measuring a position of each of said respective sliding pads on each of said respective translation modules and a position of said machine tool about said rotational axis and said pivot axis, and sending a position signal;
a controller for storing control signals for each of said respective movement device and for said machine tool, and sending said control signals; and
a control module for receiving each of said respective control signals, sending each of said respective control signals to each of said respective movement devices and to said machine tool, receiving each of said respective sensor position signals, and sending position correction signals to each of said respective movement devices.

23. The system of claim 14 further comprising:
a ballrail mounted parallel to said transverse translation module on a side opposite to said vertical translation module;
a sliding device connected to said transverse sliding pads and engaging said ballrail so as to constrain transverse movement of said transverse sliding pads and to prevent vertical movement of said transverse sliding pads.

24. The system of claim 23 wherein said sliding device comprises:
- a support plate connected to one of said transverse sliding pads;
- a semicircular aperture in said support plate having a cross section conforming to a cross section of said ballrail; and
- a plurality of ball bearings rotatably engaged in said support plate and medial said support plate and said ballrail.

25. The system of claim 14 wherein said third translation module further comprises:
- a duplicate vertical translation module aligned parallel to said third translation module and connected to said mounting device and to said vertical movement device.

26. A method of performing tooling operations on a plurality of workpieces located in a plurality of corresponding support assemblies, comprises the steps of:
- a) self leveling said support assemblies with a reference point;
- b) aligning a mobile multi-axis numerical controlled robotic tool with a first support assembly having a first workpiece;
- c) engaging, in a detachable manner, said mobile tool with said first support assembly;
- d) performing at least one tooling operation on said workpiece;
- e) disengaging said mobile tool from said first supporting assembly;
- f) transporting said mobile tool from said first support assembly to another support assembly; and
- g) repeating steps (a)–(f) for the remaining support assemblies.

27. The method of claim 26, wherein said mobile tool is aligned and engaged with said support assemblies with a plurality of proximity sensor located on said mobile tool and a plurality of engagers located on each support assembly.

28. The method of claim 26, wherein said aligning and engaging steps are performed by a self leveling system.

29. The method of claim 26, wherein said steps (a)–(g) are facilitated by a multi-movement control device coupled to said mobile tool.

30. The method of claim 26, wherein said aligning step comprises sensing position and location of the first support assembly with respect to the mobile tool and adjusting the mobile tool accordingly.

31. The method of claim 26, further comprising, before step (a), the step of configuring and storing in memory an engaging location for each support assembly.

32. The method of claim 30, wherein said sensing position and location of the first support assembly with respect to the mobile tool and adjusting the mobile tool accordingly is accomplished electrically.

33. The method of claim 30, wherein said sensing position and location of the first support assembly with respect to the mobile tool and adjusting the mobile tool accordingly is accomplished mechanically.

* * * * *